United States Patent
Hultman et al.

(10) Patent No.: US 11,811,489 B2
(45) Date of Patent: Nov. 7, 2023

(54) ADAPTIVE AND LEARNING MOTION MITIGATION FOR UPLINK POWER CONTROL

(71) Applicant: Kymeta Corporation, Redmond, WA (US)

(72) Inventors: Eric Hultman, Redmond, WA (US); Turner Noel, Kirkland, WA (US); Alexander L. Bautista, Jr., Renton, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

(21) Appl. No.: 17/127,267

(22) Filed: Dec. 18, 2020

(65) Prior Publication Data
US 2021/0203411 A1     Jul. 1, 2021

Related U.S. Application Data

(60) Provisional application No. 62/955,101, filed on Dec. 30, 2019.

(51) Int. Cl.
*H04B 7/185* (2006.01)
*H01Q 1/28* (2006.01)
*H04B 7/204* (2006.01)

(52) U.S. Cl.
CPC ......... *H04B 7/18513* (2013.01); *H01Q 1/288* (2013.01); *H04B 7/18515* (2013.01); *H04B 7/2041* (2013.01)

(58) Field of Classification Search
None
See application file for complete search history.

(56) References Cited

U.S. PATENT DOCUMENTS

| | | | |
|---|---|---|---|
| 5,812,968 A * | 9/1998 | Hassan | H04B 7/18534 704/223 |
| 6,433,736 B1 * | 8/2002 | Timothy | H01Q 1/18 342/359 |
| 6,538,602 B2 | 3/2003 | Natsume et al. | |
| 7,933,293 B2 | 4/2011 | Wentink | |
| 8,965,441 B1 | 2/2015 | Narasimhan et al. | |
| 2004/0158863 A1 * | 8/2004 | McLain | H04B 7/18506 725/76 |
| 2017/0188377 A1 * | 6/2017 | Reis | H04L 67/12 |

FOREIGN PATENT DOCUMENTS

EP     2937709 A1     10/2015

OTHER PUBLICATIONS

International Search Report and Written Opinion on the Patentability of Application No. PCT/US2020/067177 dated Apr. 19, 2021, 12 pages.
International Preliminary Report ad Written Opinion on the Patentability of Application No. PCT/US2020/067177 dated Jul. 14, 2022, 8 pages.

* cited by examiner

*Primary Examiner* — Shripal K Khajuria
(74) *Attorney, Agent, or Firm* — Womble Bond Dickinson (US) LLP

(57) ABSTRACT

Techniques for motion mitigation for uplink power control are disclosed. In one embodiment, a method for use in a satellite communication system comprises: generating a power margin associated with motion of an antenna of a satellite terminal; and generating a first power limit representing a maximum transmit power for the antenna based, at least in part, on the power margin.

18 Claims, 14 Drawing Sheets

ADAPTIVE AND LEARNING MOTION MITIGATION FOR UPLINK POWER CONTROL

RELATED APPLICATION

The present application is a non-provisional application of and claims the benefit of U.S. Provisional Patent Application No. 62/955,101, filed Dec. 30, 2019, and entitled "Adaptive and Learning Motion Mitigation for Uplink Power Control", which is incorporated by reference in its entirety.

FIELD OF THE INVENTION

Embodiments of the present invention relate to wireless communication; more particularly, embodiments of the present invention relate to uplink power control for satellite antennas that is based on power spectral density (PSD).

BACKGROUND

In the world of GEO satellite communications, the equatorial plane some 36,000 km away from the surface of the earth is typically populated every 2 degrees in longitude with a satellite. The satellite industry shares the frequency spectrum. This places a burden on the satellite communications user segment (antennas) to produce pencil-beam emissions. These pencil beams focus as much of its energy as possible on its target satellite, while protecting neighboring satellites from unwanted and/or harmful interference through spatial isolation.

It would be difficult to design an antenna that radiates zero energy towards neighboring satellites. This is widely recognized in the satellite industry, and some energy is expected to radiate towards unwanted satellite(s). However, it is critical to control the energy levels in these instances below acceptable thresholds. Satellite operators in coordination with ITU, FCC and other regulatory bodies have produced rules for maximum permissible power levels as a function of off-axis angles (away from target satellite). These rules are known as Power Spectral Density (PSD) masks, and they slightly vary depending on geographical region and satellite orbit slot nature. As such, most commonly enforced PSD masks are:
 FCC PSD Mask
 ITU PSD Mask
 Coordinated PSD Mask To stay compliant with regulatory PSD masks, an antenna/terminal operator has two choices: expand bandwidth of the channel in use when non-compliance is detected or lower the power output of the terminal when non-compliance is detected. In certain commercial satellite communication network configurations, bandwidth of the transmit (Tx) channels is fixed and cannot be changed dynamically, leaving power back-off as the only option.

SUMMARY

Techniques for motion mitigation for uplink power control are disclosed. In one embodiment, a method for use in a satellite communication system comprises: generating a power margin associated with motion of an antenna of a satellite terminal; and generating a first power limit representing a maximum transmit power for the antenna based, at least in part, on the power margin.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
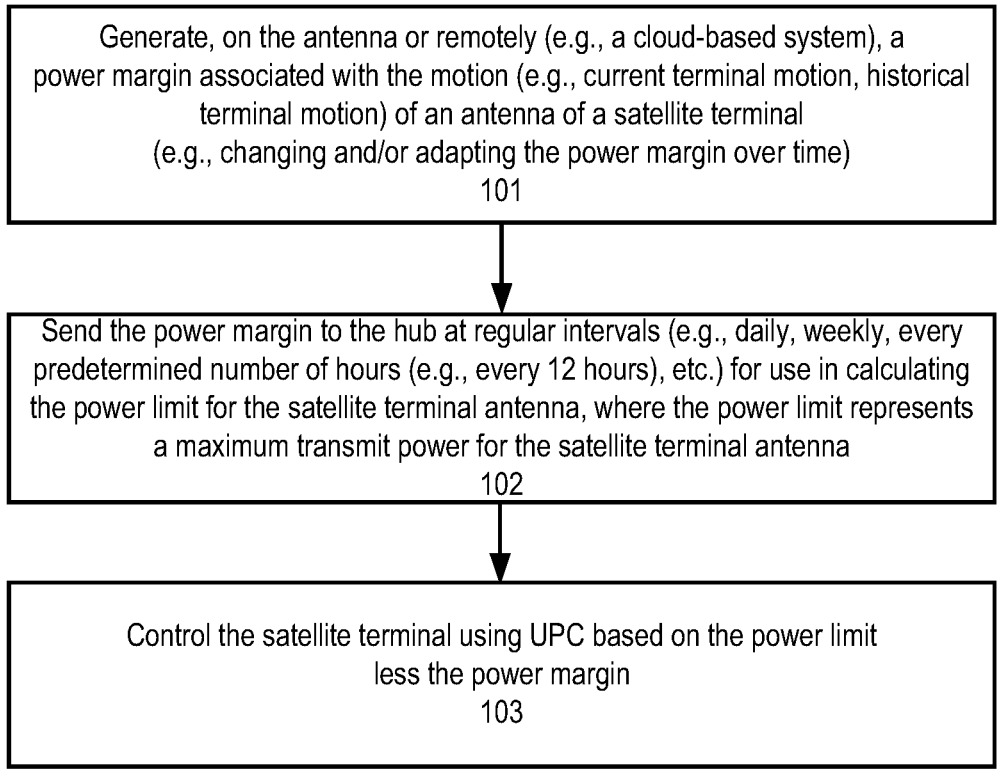
FIG. 1A is a flow diagram of one embodiment of a process for performing uplink power control (UPC).

A method and apparatus for performing uplink power control (UPC) for a satellite terminal antenna in a satellite communication system are disclosed. In one embodiment, the satellite antenna is a flat-panel antenna that electronically steers a beam using antenna elements. Examples of such antennas are described in more detail below. The techniques disclosed herein improve satellite terminal uplink throughput and efficiency and are not limited for use to the antennas described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

In one embodiment, the improvement in terminal uplink throughput and efficiency is achieved by adaptively changing the uplink power margin for UPC to take into account for motion of the satellite terminal antenna. The motion of different satellite terminal antennas may be due to different implementations of those antennas. For example, a satellite terminal attached to a moving vehicle such as car or a boat. The car and boat has different motions and are in different environments, thereby resulting in those antennas having different motion profiles. In one embodiment, the power margin associated with the motion of the antenna is based on the motion profile of the antenna. In one embodiment, the motion profile, and thus the corresponding motion margin, is based on the current terminal motion. In another embodiment, the motion profile, and thus the corresponding motion margin, is based on current and historical terminal motion. In the aggregate, this leads to less power margin needed for motion, which means more power can be used to transmit, thereby leading to an overall higher throughput and efficiency. For example, in one embodiment, at the beginning of operation (i.e., a first time), the power margin for motion starts as a large margin (e.g., ~2 dB) where there is no history data, but as motion data is collected over time there may be a reduction in motion margin (to <2 dB) if the terminal is not operating under what is considered maximum motion that would warrant having the initial power margin for motion used.

In one embodiment, management of uplink power margin for motion is handled by the terminal, instead of the hub. In one embodiment, this results in up to 2 dB more of uplink power. In one embodiment, this is done in a dynamic and scalable way, with no need to update PSD tables. That is, in one embodiment, the UPC is performed using the PSD limit. The PSD of an antenna is defined as the Equivalent Isotropic Radiated Power (EIRP) divided by the ratio of bandwidth of the transmitted signal versus a designated bandwidth per the regulatory body. Different space regulations (e.g., FCC, ITU, etc.) have different standards and maximum allowances for PSD. For example, the FCC, which regulates the space and frequency over the United States, has a density requirement of dBW/4 kHz bandwidth, whereas the ITU has a density requirement in units of dBW/40 khz and governs most of the rest of the world. Therefore, for different locations on the Earth, in one embodiment, the terminal is aware of the region in which it is located, and with that, what requirements it must follow. It is also not uncommon for a satellite operator to set its own PSD limits for a satellite that may be stricter than the limit set by the ruling space regulation committee. In one embodiment, a goal is to be as close to the PSD limit as possible while holding enough margin to be confident that the PSD will not exceed pre-calculated limits, and the closer the PSD is to the limit, more modulation and coding schemes may be used which allow for a larger data rate to be achieved, or a smaller carrier to transmit the same data rate equaling more efficient network capacity.

In one embodiment, at least a portion of the techniques for adaptively changing the uplink power margin for motion based on current and historical terminal motion are implemented in software. In one embodiment, determining the correct amount of power margin for motion is performed in an automated or learned way, in software, such that each terminal can achieve optimal performance. This means that analysis, test, and configuration per terminal type, installation, or use case is not needed for power margin for motion prior to their use in the field.

Thus, in one embodiment, as described in more detail below, the techniques for improving terminal uplink throughput and efficiency include new features that include: accounting for motion margin at the terminal, and not the hub; adapting an amount of motion margin based on current motion; and learning by the terminal itself an amount of motion margin needed for UPC. This use of power margin is beneficial in that the amount of power used by a terminal for transmit increases, yielding higher throughput and efficiency and allowing the terminal to use higher modcods, which leads to higher bits per hertz transmitted.

Furthermore, the techniques disclosed herein improves on current UPC systems that rely on hub-based accounting for power margin for motion. The techniques disclosed herein are novel because UPC solutions rely on the hub, and the hub accounts for UPC margins, including for motion. This means that any change in power ranges due to terminal motion incur a round-trip delay: motion related information is sent to the hub and the hub sends back an updated, allowable, transmit power, range. Note that power related information can be in multiple forms, including current orientation, velocity, rotational acceleration, or values calculated from such information, such as the terminal's current power limit.

FIG. 1A is a flow diagram of one embodiment of a process for performing UPC. In one embodiment, the process is performed by processing logic that may comprise hardware (circuitry, dedicated logic, etc.), software (e.g., software running on a chip), firmware, or a combination of the three. In one embodiment, operations of the process of FIG. 1A are performed by a controller, including one or more processors, of the satellite terminal. In another embodiment, operations of the process of FIG. 1A are performed by a controller, including one or more processors, of the satellite terminal and/or a hub in a satellite communication system.

Referring to FIG. 1A, the process begins by processing logic generating a power margin associated with the motion of an antenna of a satellite terminal (processing block 101). In one embodiment, the power margin is generated on the antenna. In an alternative embodiment, the power margin is generated remotely such as with, for example, a cloud-based server or computer-based system. In one embodiment, generating the power margin associated with the motion of an antenna of a satellite terminal comprises changing and/or adapting the power margin over time.

After the power margin has been generated, the processing logic sends the power margin to the hub for use in calculating the power limit for the antenna of the satellite terminal (processing block 102). In one embodiment, processing logic send the power margin to the hub at regular intervals. The regular intervals may comprise daily, weekly, every predetermined number of hours (e.g., every hour, every 8 hours, every 12 hours, etc.).

Using the power limit, processing logic controls the satellite terminal using UPC (processing block 103). In one embodiment, the hub sends back a power limit back to the satellite terminal which uses the power limit specified by the hub to limit its transmit power in accordance with UPC.

In one embodiment, the techniques disclosed herein, the terminal accounts for power margin for motion by reducing the power limit it reports back to the hub. In one embodiment, for the terminal to account for the power margin for motion by reducing the power limit it reports back to the hub, the terminal learns its own motion profile, rather than relying on a one-time analysis for the terminal and static setting at the hub on a per terminal or terminal type basis.

Figure 1B:
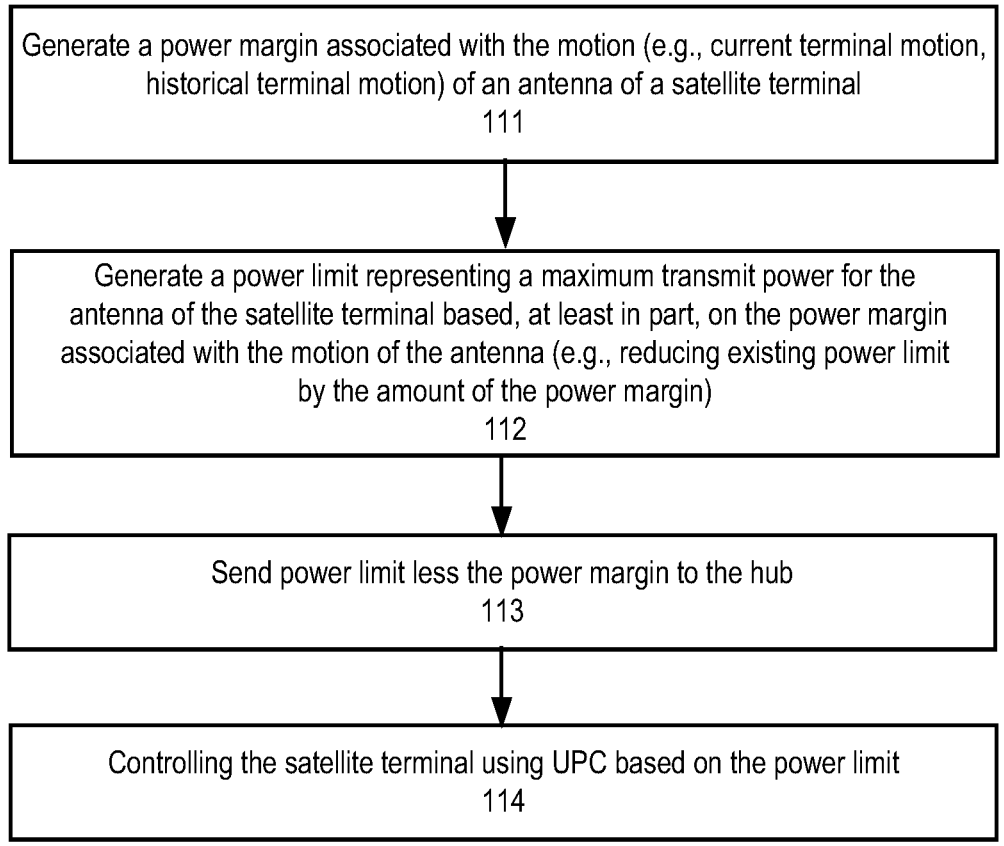
FIG. 1B is a flow diagram of one embodiment of another process for performing UPC for satellite terminal.

FIG. 1B is a flow diagram of one embodiment of another process for performing UPC for satellite terminal. In one embodiment, the process is performed by processing logic that may comprise hardware (circuitry, dedicated logic, etc.), software (e.g., software running on a chip), firmware, or a combination of the three. In one embodiment, operations of the process of FIG. 1B are performed by a controller, including one or more processors, of the satellite terminal. In another embodiment, operations of the process of FIG. 1B are performed by a controller, including one or more processors, of the satellite terminal and/or a hub in a satellite communication system.

Referring to FIG. 1B, the process begins by processing logic generating a power margin associated with the motion (or motion profile) of a satellite terminal antenna (processing block 111). In one embodiment, the motion includes current terminal motion. In another embodiment, the motion of the antenna includes historical terminal motion and current terminal motion. Note that when using both current terminal motion and historical terminal motion for generating a power margin for motion, the two may be combined through the use of weighting (e.g., Fourier transforms) so that current terminal motion is weighted more heavily than past historical terminal motion.

After generating the power margin, processing logic generates a power limit representing a maximum transmit power for the antenna of the satellite terminal based, at least in part, on the power margin associated with motion of the antenna (processing block 112). In one embodiment, generating the power limit comprises reducing an existing power limit by an amount of the power margin for motion.

After generating the power limit, processing logic sends the power limit less the power margin to the hub (processing block 113) and the transmit power of the satellite terminal is then controlled using UPC based on the power limit (processing block 114). In one embodiment after sending the power limit less the power margin to the hub, the hub updates or sends another power limit to the satellite terminal to control the transmit power of the antenna of the satellite terminal using UPC.

In one embodiment, the motion profile that is used to generate a power margin for motion uses at least a sensor or sensors for orientation. Such sensors may determine a current orientation, a change in orientation, and/or a rate of change in orientation. Similarly, sensors for velocity or acceleration could be used to obtain information to augment the orientation information. Other information used to create a motion profile may include whether the satellite terminal has a connection or not, the frequency at which the satellite terminal antenna is to operate, and other information (e.g. current errors (e.g., CRC, etc.), operating modcods (e.g., forward carrier, adaptive coding modulation (ACM), etc.), BUC (Block Upconverter) or amplifier power range, including BUC linear range, antenna gain, antenna gain based on orientation, temperature, antenna temperature performance, etc.).

Figure 2:
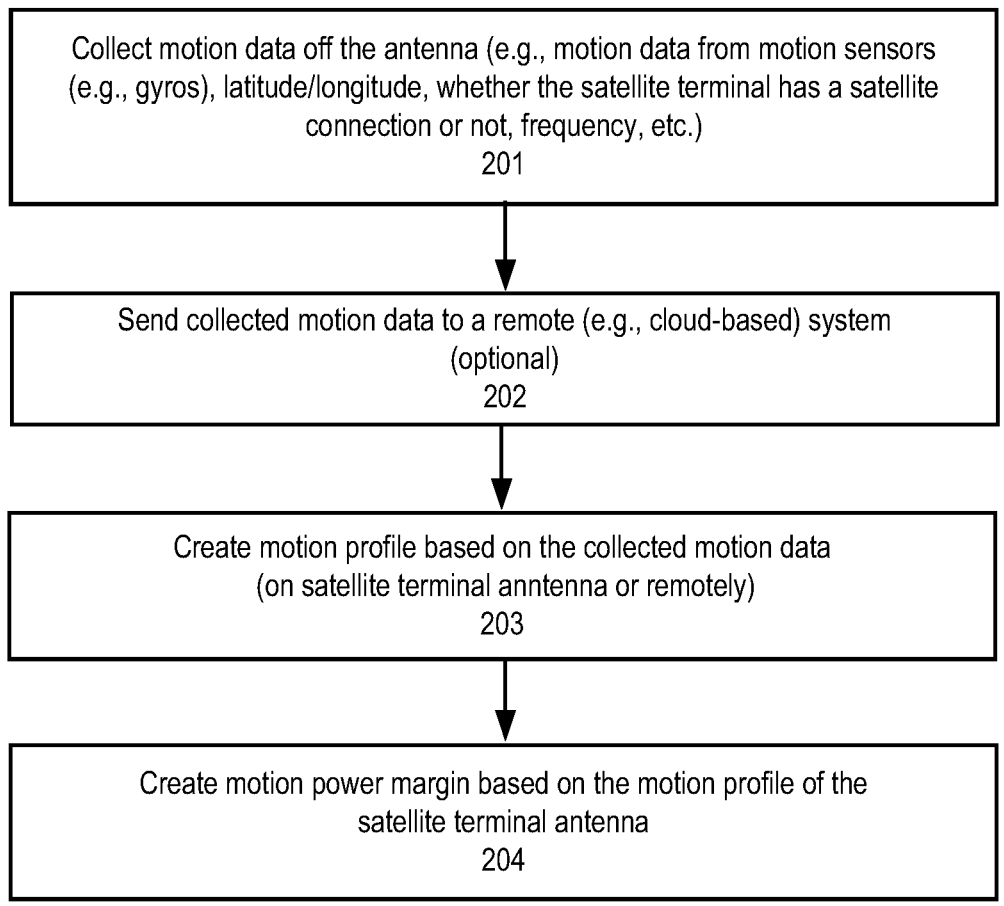
FIG. 2 is a flow diagram of one embodiment of a process for generating a motion profile of a satellite terminal antenna.

FIG. 2 is a flow diagram of one embodiment of a process for generating a motion profile of a satellite terminal antenna. In one embodiment, the process is performed by processing logic that may comprise hardware (circuitry, dedicated logic, etc.), software (e.g., software running on a chip), firmware, or a combination of the three. In one embodiment, operations of the process of FIG. 2 are performed by a controller, including one or more processors, of the satellite terminal. In another embodiment, operations of the process of FIG. 2 are performed by a controller, including one or more processors, of the satellite terminal, a cloud-based server or other computer system, and/or a hub in a satellite communication system.

Referring to FIG. 2, the process begins by processing logic collecting motion data from an antenna (processing block 201). In one embodiment, the motion data includes motion data from motion sensors on the antenna such as, for example, gyroscopes, accelerometers, etc. In one embodiment the motion data also includes longitude and latitude data where the term satellite terminal has a satellite connection or not, frequency at which the antenna is to be operated, and other motion data.

In response to the collected motion data, processing logic sends the collected motion data to a remote system (processing block 202). In one embodiment, this is optional. In one embodiment, the remote system is a cloud-based system for generating the motion profile based on the collective motion data.

In response to the collected motion data, processing logic creates a motion profile (processing block 203). In one embodiment this is done on a satellite terminal itself using one or more processors of a controller. In another embodiment this is done, as described above, in a cloud-based system.

Using the motion profile, a motion power margin is created for the satellite terminal antenna (processing block 204). The power margin may be used, as described above, in calculating the power limit for the satellite terminal antenna.

Figure 3:
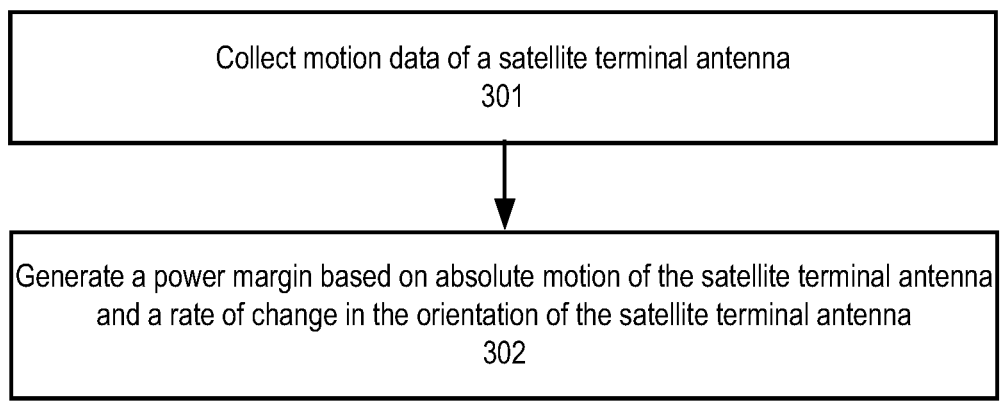
FIG. 3 illustrates an alternative embodiment for generating a power margin that may be used in setting a power limit for a satellite terminal antenna.

FIG. 3 illustrates an alternative embodiment for generating a power margin that may be used in setting a power limit for a satellite terminal antenna. In one embodiment, the process is performed by processing logic that may comprise hardware (circuitry, dedicated logic, etc.), software (e.g., software running on a chip), firmware, or a combination of the three. In one embodiment, operations of the process of FIG. 1A are performed by a controller, including one or more processors, of the satellite terminal. In another embodiment, operations of the process of FIG. 3 are performed by a controller, including one or more processors, of the satellite terminal and/or a hub in a satellite communication system.

Referring to FIG. 3, processing logic collects the motion data with satellite terminal antenna (processing block 301). Using the collected motion data, processing logic generates a power margin based on absolute motion data of its satellite antenna and a rate of change in orientation of the satellite terminal antenna (processing block 302). In one embodiment, processing logic generates a power margin based on absolute motion data of its satellite antenna and a rate of change in orientation of the satellite terminal antenna by averaging (e.g., a rolling average for rate of change for some predetermined time), with the absolute motion data being the instantaneous motion from the sensors on the satellite terminal. From that information, and accounting for other historical motion data (e.g., data stored in memory 512 of FIG. 5), processing logic can determine the power based margin. In another embodiment, if the absolute maximum degree per second (DPS) change is known, processing logic can determine how much hub margin needs to be held due to the time delay of the hub.

Figure 4:
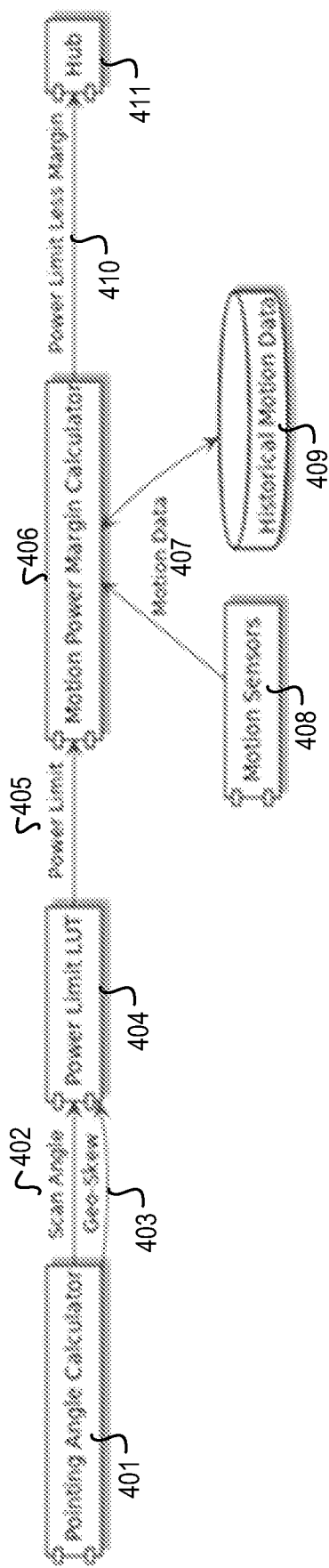
FIG. 4 illustrates a flow diagram of one embodiment of a process for generating a power limit for a satellite terminal antenna.

FIG. 4 illustrates a flow diagram for a satellite terminal antenna generating a power limit. In one embodiment, the process is performed by processing logic that may comprise hardware (circuitry, dedicated logic, etc.), software (e.g., software running on a chip), firmware, or a combination of the three. In one embodiment, operations of the process of FIG. 1A are performed by a controller, including one or more processors, of the satellite terminal. In another embodiment, operations of the process of FIG. 4 are performed by a controller, including one or more processors, of the satellite terminal.

Referring to FIG. 4, a pointing angle calculator 401 generates a scan angle 402 and a geoskew 403. The processing logic uses scan angle 402 and geographic skew angle (geoskew) 403 to access a power look-up table (LUT) 404. In response, processing logic outputs power limit 405 from power limit LUT 404 based on scan angle 402 and geoskew 403. Power limit 405 is received by motion power margin calculator 406 along with motion data 407 from motion sensors 408 and historical motion data stored in storage 409. Based on power limit 405 and the motion data 407, motion power margin calculator 406 generates a power limit less the margin 410 and sends it to hub 411. That is, motion power margin calculator 406 takes the PSD limit and subtracts out the motion power margin to generate the power limit 405 less margin 410 and sends it to hub 411.

Therefore, in one embodiment, the PSD is gathered from the ASM, and a power margin can be calculated from capturing the motion profile to generate a specific margin for that terminal. Then this PSD less the power margin is sent to the hub, and the hub side power margin may be set to 0 dB, essentially increasing efficiency by making each margin unique rather than one large coarse value.

In one embodiment, motion power margin calculator 406 generates the power margin for motion using rate of change and the absolute motion of the satellite terminal antenna. In one embodiment, this is performed as described above. In one embodiment, motion power margin calculator 406 examiners the PSD limit and determines the amount of change that can occur over the motion provide. In one embodiment, the power margin is set based on the amount of motion that may occur during the time the delay in waiting for the hub to respond with respect to the power limit less the power margin for motion that is provided from the terminal. For example, if the PSD limit is set to 20 and the amount of change in motion is limited to no more than 10-15°/second with two different PSD limits for two different thetas that are 2 dB in difference, then the power limit less the power margin is set to 18 based on the amount of motion during the delay in waiting for the hub to respond with respect to the power limit less the power margin for motion.

In one embodiment, motion power margin calculator 406 determines the power margin and subtracts it from the power limit 405 to generate power limit less margin 410.

In one embodiment, motion power margin calculator 406 has two states: moving vs. not moving and generates a power margin for use when the satellite terminal antenna is moving. The motion upon which it bases the motion margin may be motion over a particular time period (e.g., motion over the past 5 minutes) or could be over a longer period of time (e.g., a terminal's motion over several days (e.g., 10 days). In one embodiment, in such a case, motion power margin calculator 406 may cull outliers and determine the maximum expected motion over the time period used. In one embodiment, motion power margin calculator 406 uses machine learning and artificial intelligence to determine a motion profile and/or a power margin for motion. Such information may include other forms of information, including current position, temperature, time of year, etc.

Figure 5:
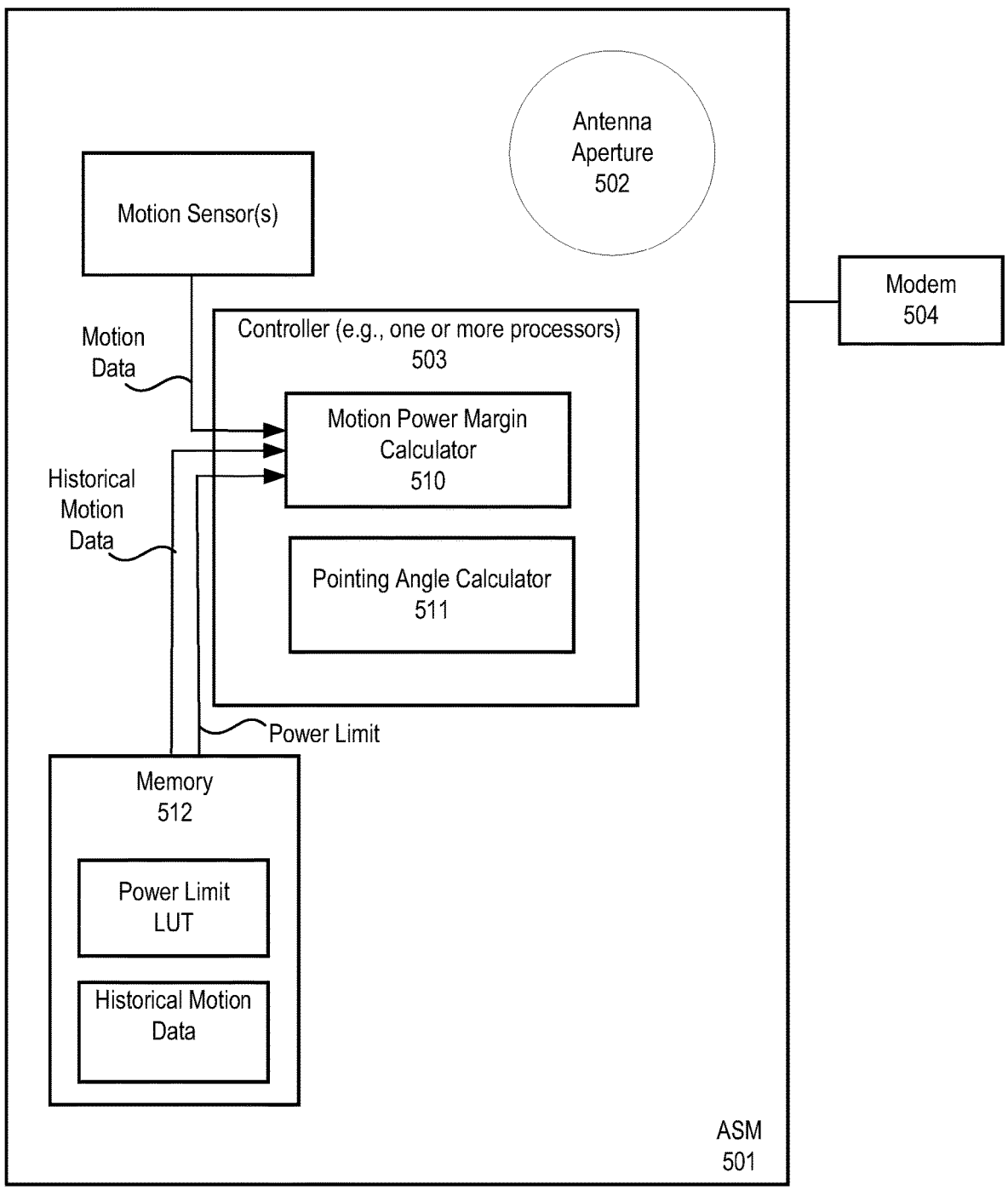
FIG. 5 illustrates one embodiment of a satellite terminal that includes an antenna subsystem module (ASM).

FIG. 5 illustrates one embodiment of a satellite terminal that includes an antenna subsystem module (ASM) 501 coupled to a modem 504. In one embodiment, modem 504 is part of ASM 501. In one embodiment, ASM 501 includes an antenna aperture 502 and controller 503. Antenna aperture 503 may include, for example, but not limited to, an antenna aperture described herein.

In one embodiment, controller 503 comprises one or more processors for performing operations for the satellite terminal. In one embodiment, controller 503 includes a motion power margin calculator 510 and a pointing angle calculator 511, such as, for example, those described in FIG. 4. In one embodiment, the terminal also includes one or more motion sensors, such as, for example, motion sensor 408 shown in FIG. 4, for providing current motion information and a memory 512 for storing and providing historical motion data, such as, for example, historical data storage 409 shown in FIG. 4. In one embodiment, memory 512 includes a power limit LUT such as, for example, power limit LUT 404 shown in FIG. 4.

In one embodiment, controller 503 generates a new power margin using motion power margin calculator 510 and sends it to a hub at regular intervals (e.g., every day) via antenna aperture 502. In another embodiment, the power margin is maintained in the terminal and the controller generates a UPC power limit using the power margin.

Additionally, in one embodiment, the terminal of FIG. 5 is in communication with the hub and/or another remote system (e.g., a cloud-based server or computer system) for sending updated algorithms to the terminal for generating the power margin for motion.

The embodiments disclosed herein have one or more of the following advantages. One advantage is the ability to require less margin on terminal uplink, thus allowing for more transmit power, which leads to more bits per hertz. For the ability to use less margin, this advantage is proportional to the amount of change in uplink power limit relative to antenna orientation. For example, an elliptical parabolic antenna will have some improvement, but a flat panel, electronically scanned antenna (ESA), will have more benefit. Second, there is less engineer effort required for each terminal to take advantage of the aforementioned ability. For the engineering effort required, this advantage grows with the variability of installations. Normally, each type of terminal installation (e.g., car, truck, boat, ship, plane, train) would have to be studied and characterized to develop a motion profile and a corresponding power margin for motion. The results of that characterization would then need to be programmed into the hub. With this approach, each individual installation can learn what margin is necessary and then employ it as part of UPC.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
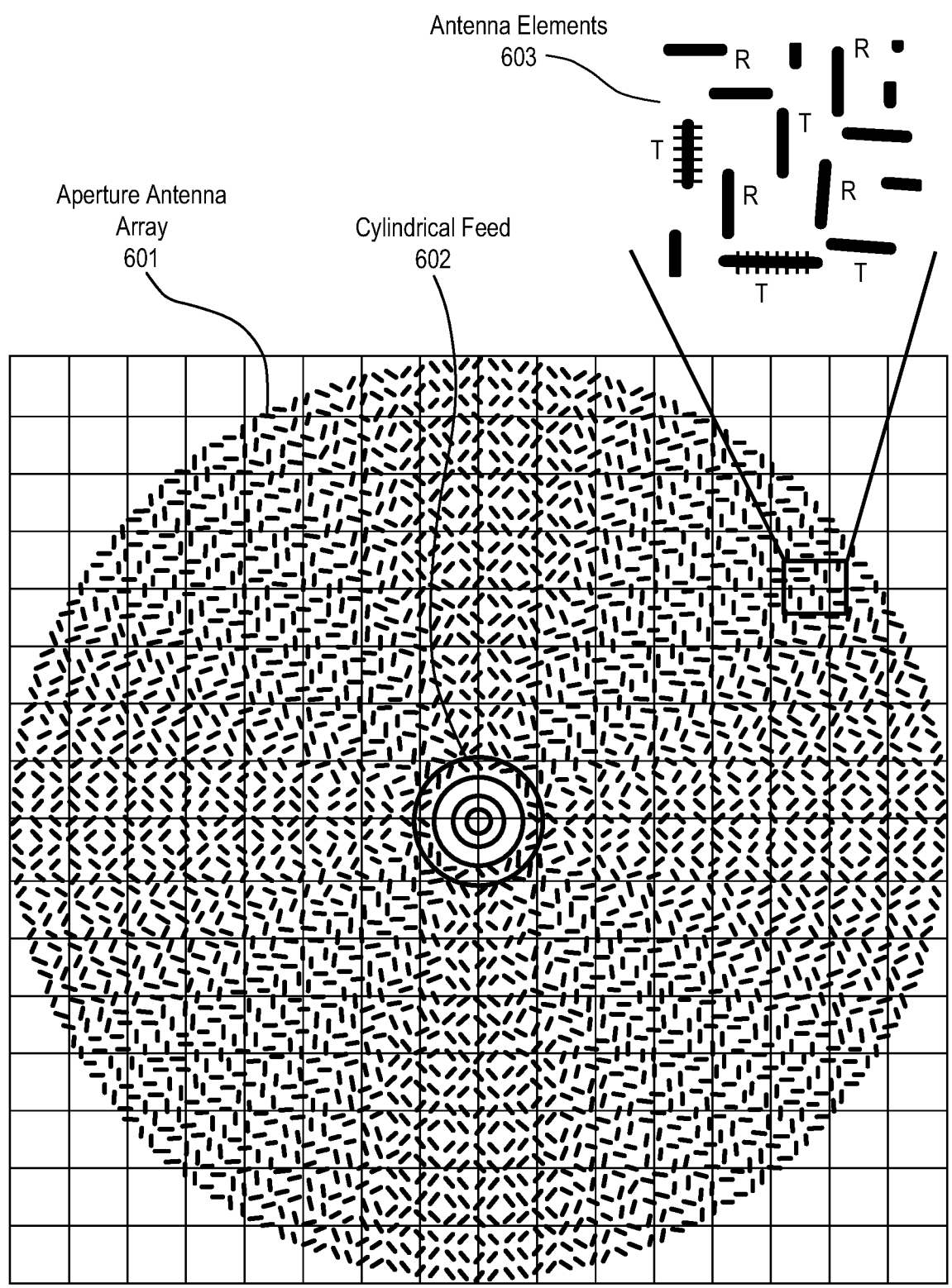
FIG. 6 illustrates an aperture having one or more arrays of antenna elements placed in concentric rings around an input feed of the cylindrically fed antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Examples of such antenna elements are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 6 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the-shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
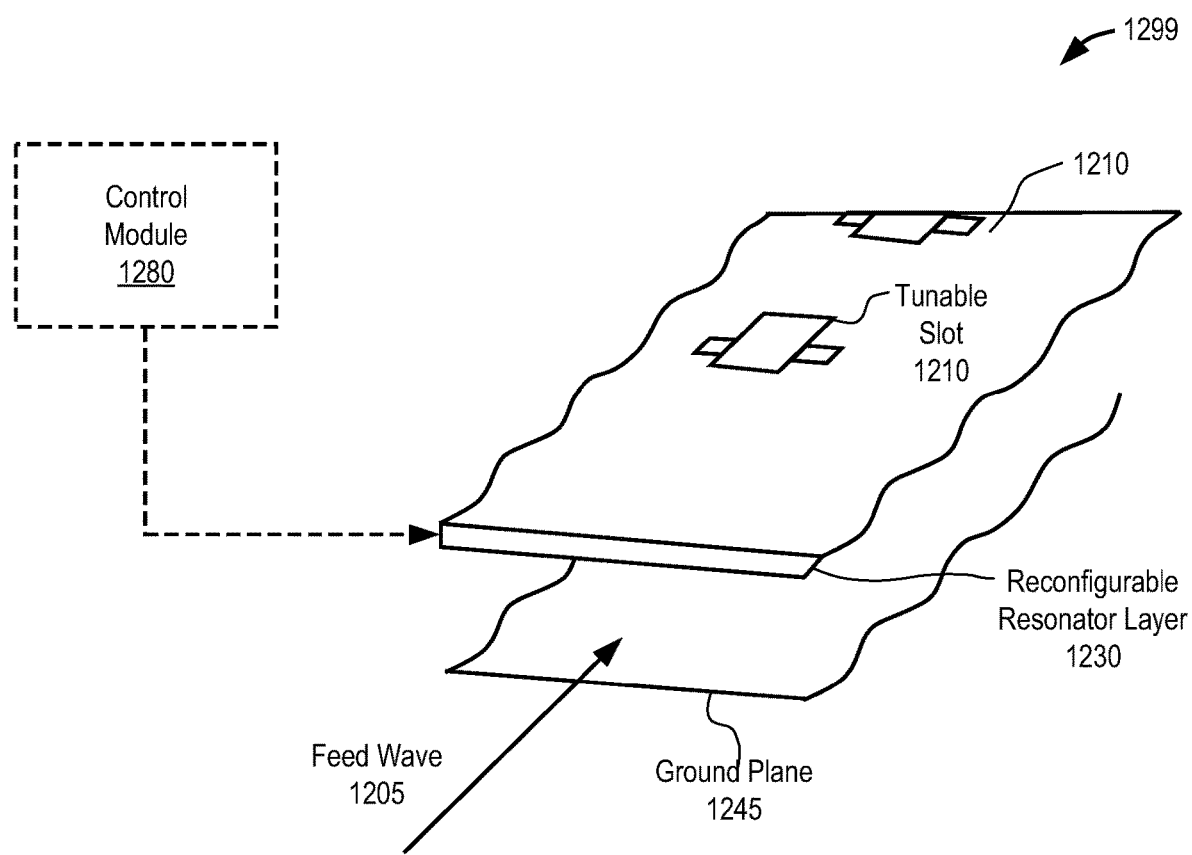
FIG. 7 illustrates a perspective view of one row of antenna elements that includes a ground plane and a reconfigurable resonator layer.

FIG. 7 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 8A:
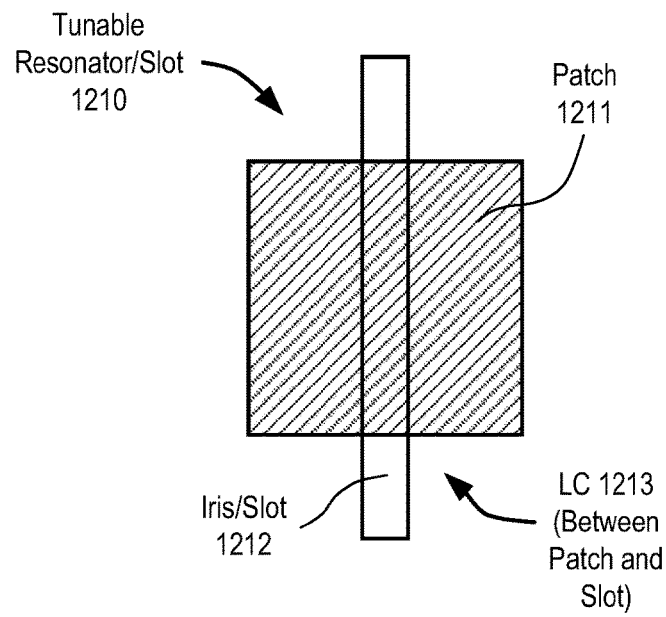
FIG. 8A illustrates one embodiment of a tunable resonator/slot.

Control module 1280 is coupled to reconfigurable resonator layer 1230 to modulate the array of tunable slots 1210 by varying the voltage across the liquid crystal in FIG. 8A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram} = w^*_{in} w_{out}$, with $w_{in}$ as the wave equation in the waveguide and $w_{out}$ the wave equation on the outgoing wave.

FIG. 8A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8B:
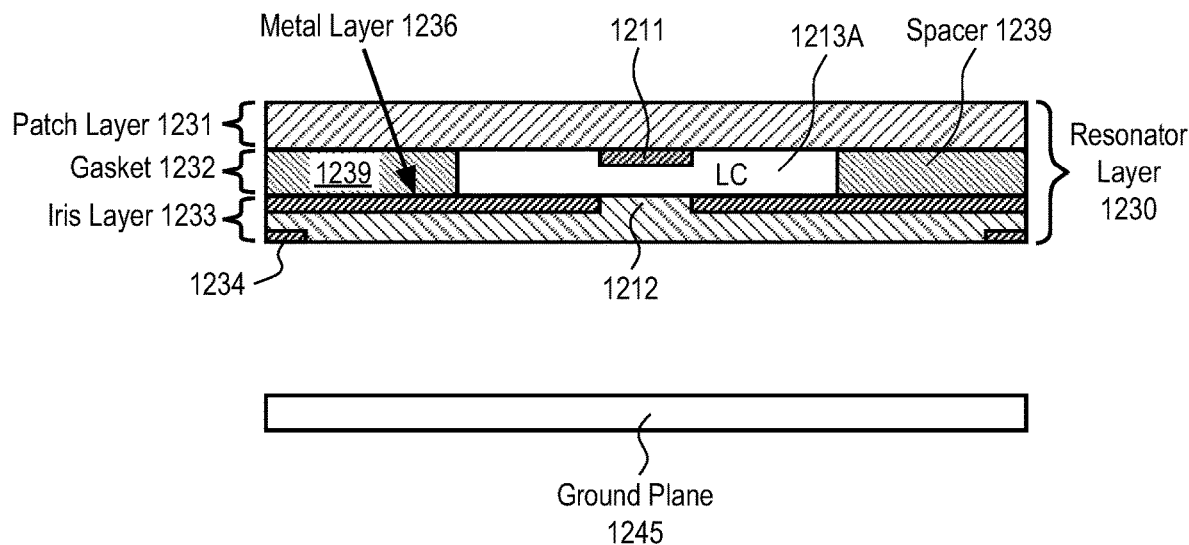
FIG. 8B illustrates a cross section view of one embodiment of a physical antenna aperture.

FIG. 8B illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 8B includes a plurality of tunable resonator/slots 1210 of FIG. 8A. Iris/slot 1212 is defined by openings in metal layer 1236. A feed wave, such as feed wave 1205 of FIG. 7, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 8B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8B includes multiple tunable resonator/slots, such as tunable resonator/slot 1210 includes patch 1211, liquid crystal 1213, and iris 1212 of FIG. 8A. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $f=1/2\pi\sqrt{LC}$ where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 1A. Note that in this example the antenna array has two different types of antenna elements that are used for two different types of frequency bands.

Figure 9A:
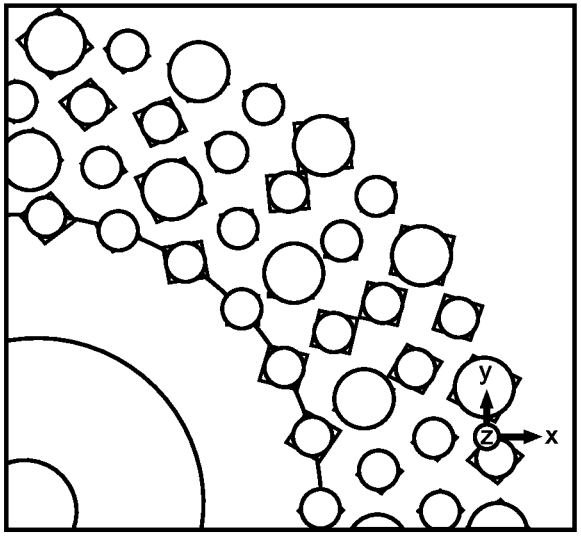
FIGS. 9A-D illustrate one embodiment of the different layers for creating the slotted array.
Figure 9B:
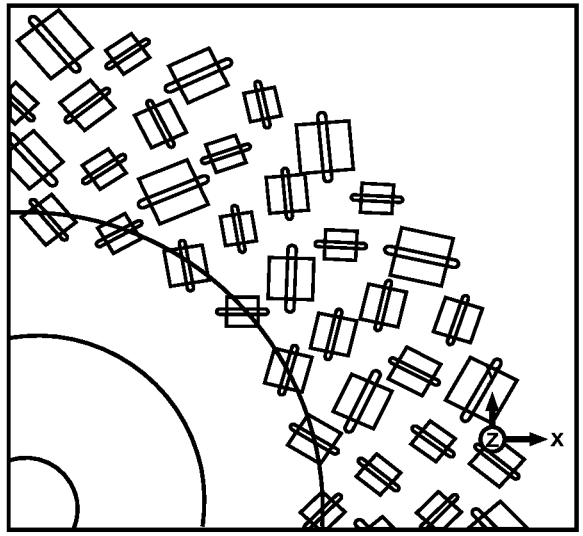
Figure 9C:
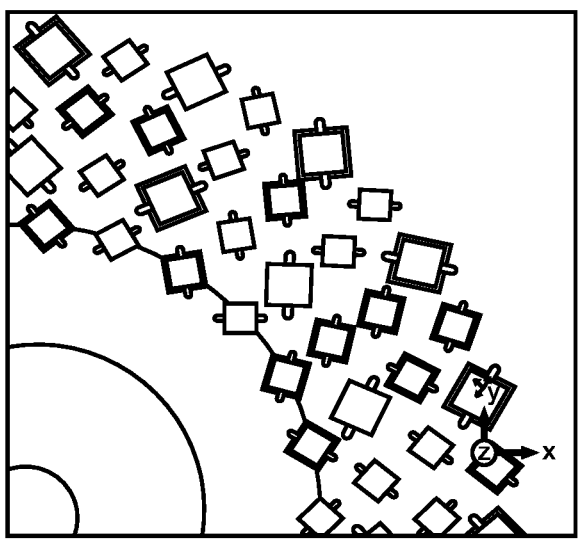
Figure 9D:
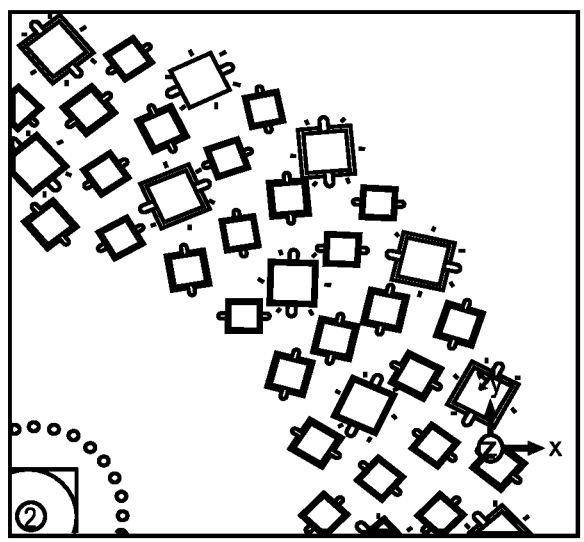

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
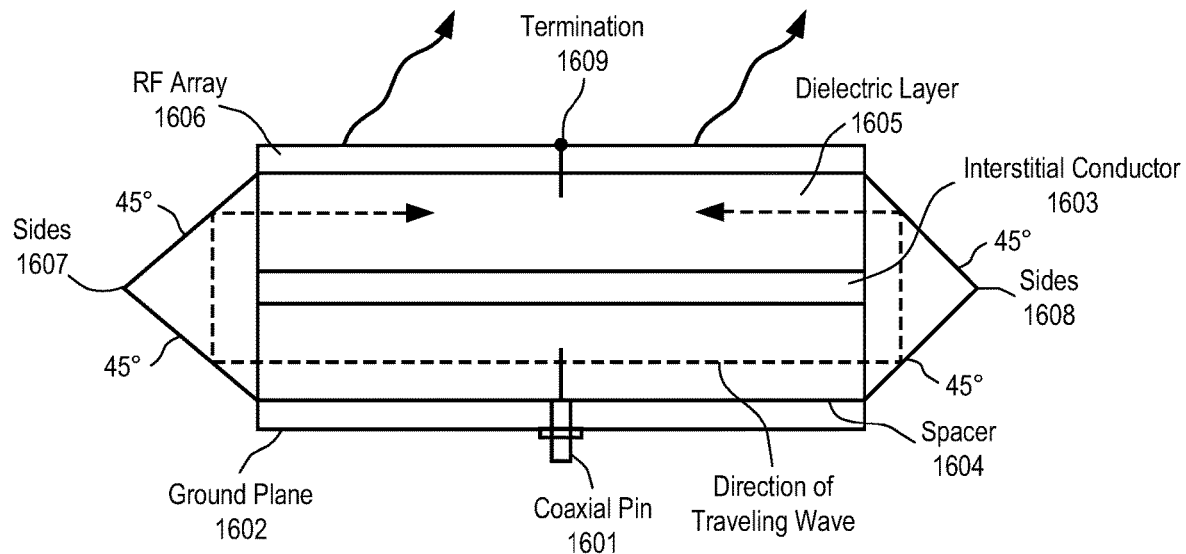
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
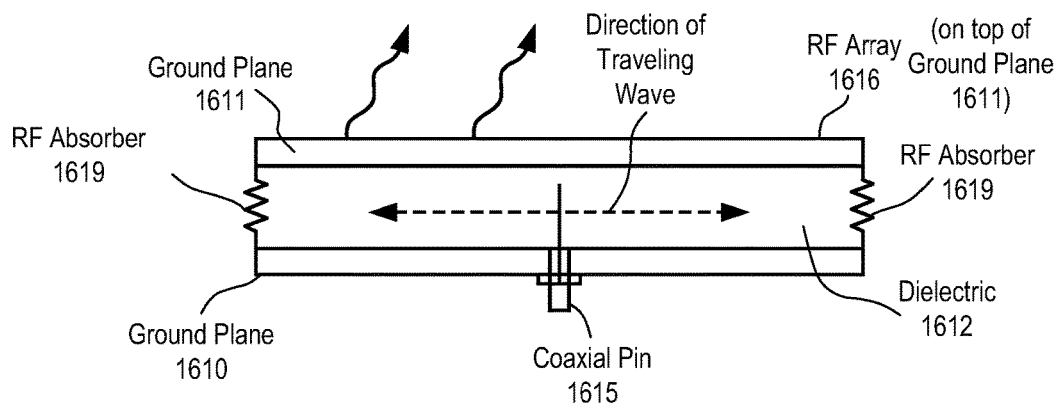
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five-degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
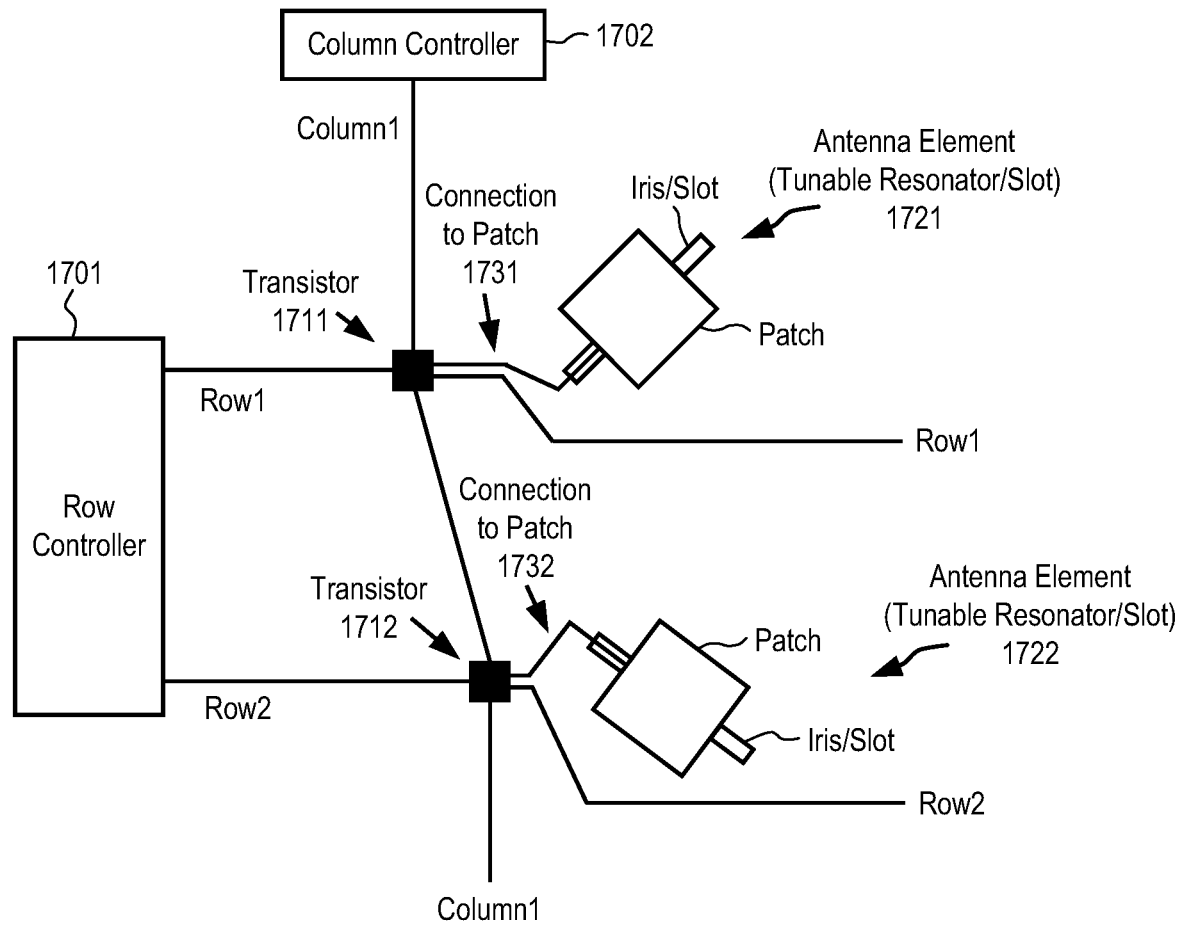
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is pre-defined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
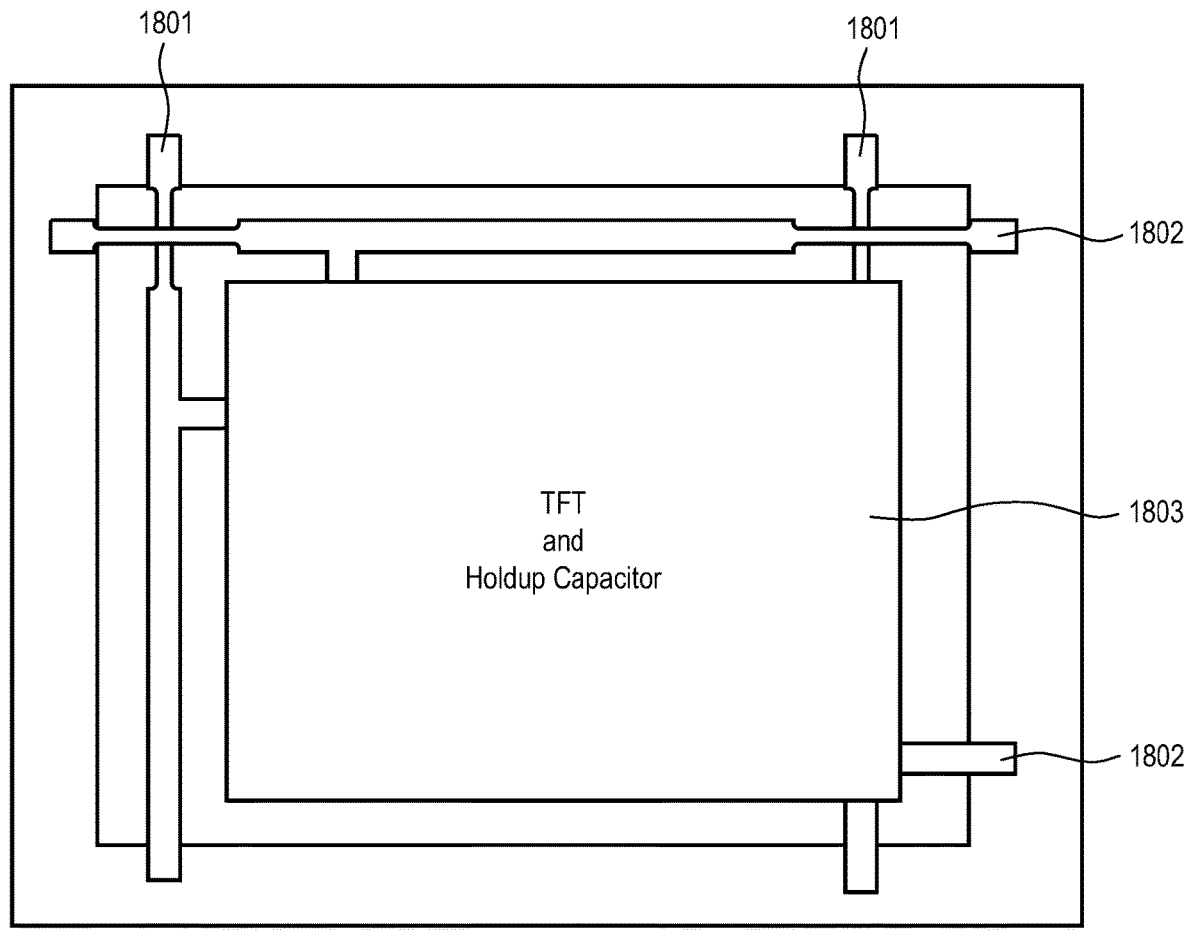
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
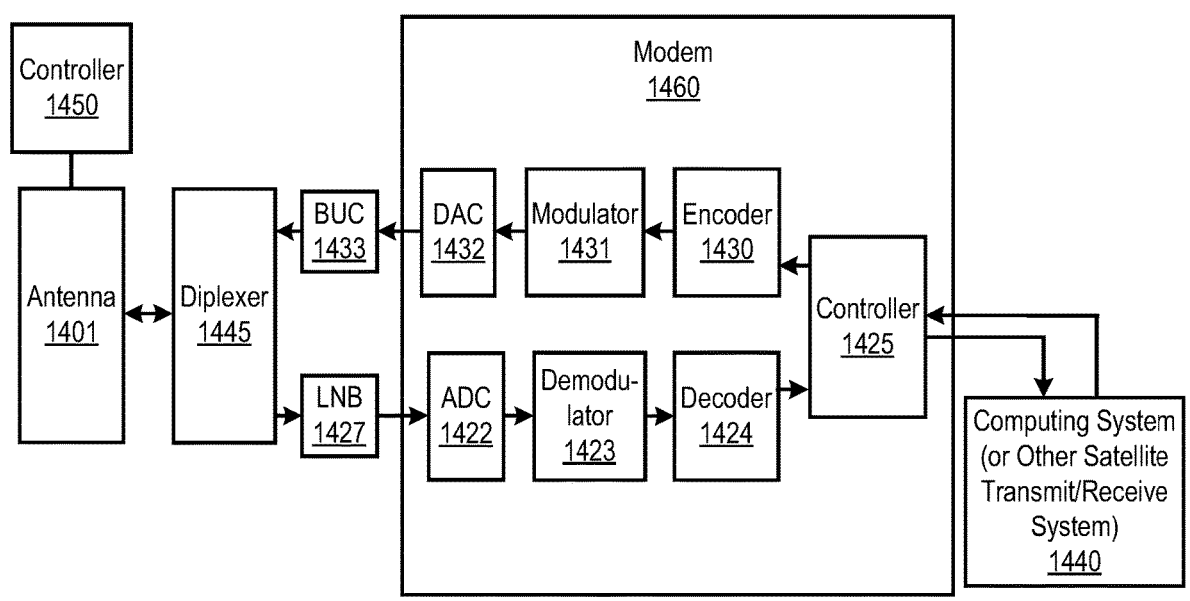
FIG. 14 is a block diagram of another embodiment of a communication system having simultaneous transmit and receive paths.

In another embodiment, the combined antenna apertures are used in a full duplex communication system. FIG. 14 is a block diagram of another embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

There is a number of example embodiments described herein.

Example 1 is method for use in a satellite communication system, the method comprising: generating a power margin associated with motion of an antenna of a satellite terminal; and generating a first power limit representing a maximum transmit power for the antenna based, at least in part, on the power margin.

Example 2 is the method of example 1 that may optionally include that the power margin is generated by the antenna.

Example 3 is the method of example 2 that may optionally include that the power margin is based on a motion profile created based on motion data representing motion of the terminal collected by the terminal.

Example 4 is the method of example 1 that may optionally include that the motion profile being based on motion of the antenna over a period of time.

Example 5 is the method of example 1 that may optionally include sending, by the terminal, the first power limit to a hub in the satellite communication system.

Example 6 is the method of example 1 that may optionally include that the power margin is based on current and historical motion of the antenna.

Example 7 is the method of example 1 that may optionally include adapting the power margin over time.

Example 8 is the method of example 1 that may optionally include changing the power margin based on predicted motion of the antenna motion.

Example 9 is the method of example 1 that may optionally include that generating the first power limit comprises reducing the second power limit based on the power margin.

Example 10 is the method of example 1 that may optionally include calculating the pointing angle, including generating a scan angle and a geographic skew angle of the antenna; generating a second power limit based on the scan angle and the geographic skew angle; and updating the second power limit to create the first power limit by reducing the second power limit by the power margin based on motion data.

Example 11 is the method of example 10 that may optionally include that the motion data comprises data from one or more motion sensors of the antenna and historical motion data of the antenna.

Example 12 is the method of example 11 that may optionally include that generating the power limit based on the scan angle and the geographic skew angle comprises obtaining the second power limit from a lookup table (LUT) using the scan angle and geographic skew angle.

Example 13 is a satellite terminal for use in a satellite communication system, the terminal comprising: an aperture having radiating antenna elements operable to radiate radio frequency (RF) signals; a modem coupled to the aperture; one or more processors coupled to the modem and operable to: perform a motion power margin calculation by generating a power margin associated with motion of an antenna of a satellite terminal, generate a first power limit representing a maximum transmit power for the antenna based, at least in part, on the power margin, and send the first power limit to a satellite hub.

Example 14 is the terminal of example 13 that may optionally include that the one or more processors are part of an antenna subsystem module (ASM) that includes the aperture.

Example 15 is the terminal of example 13 that may optionally include that the one or more processors generate the first power limit by reducing a second power limit based on the power margin.

Example 16 is the terminal of example 13 that may optionally include that the power margin is generated by the antenna based on a motion profile created based on motion data representing motion of the terminal collected by the terminal.

Example 17 is the terminal of example 13 that may optionally include that the one or more processors are further operable to: calculate the pointing angle, including outputting a scan angle and a geographic skew angle of the antenna; generate a second power limit based on the scan angle and the geographic skew angle; and update the second power limit to create the first power limit by reducing the second power limit by the power margin based on motion data.

Example 18 is an article of manufacture having one or more non-transitory computer readable media storing instruction thereon which, when executed by a terminal having an antenna, a modem and a controller, cause the terminal to perform a method comprising: generating a power margin associated with motion of an antenna of a satellite terminal; and generating a first power limit representing a maximum transmit power for the antenna based, at least in part, on the power margin.

Example 19 is the article of manufacture of example 18 that may optionally include that generating the first power limit comprises reducing the first power limit based on the power margin.

Example 20 is the article of manufacture of example 18 that may optionally include that the method further comprises: calculating the pointing angle, including outputting a scan angle and a geographic skew angle of the antenna; generating a second power limit based on the scan angle and the geographic skew angle, including obtaining the second power limit from a lookup table (LUT) using the scan angle and geographic skew angle; and updating the second power limit to create the first power limit by reducing the second power limit by the power margin based on motion data, wherein the motion data comprises data from one or more motion sensors of the antenna and historical motion data of the antenna.

Example 21 is a method for use in a satellite communication system, the method comprising: generating a power margin associated with motion of an antenna of a satellite terminal; and sending the power margin to the hub for use in generating a power limit for the satellite terminal for UPC.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for use in a satellite communication system, the method comprising: changing an uplink power margin, based on Power Spectral Density (PSD) and based on a motion profile created using current and historical motion of an antenna of a satellite terminal, to avoid the PSD of the antenna exceeding a PSD limit, wherein the current and historical motion of the antenna is based on motion data representing motion of the terminal collected by the terminal; and performing uplink power control by generating a first power limit representing a maximum transmit power for the antenna based, at least in part, on the uplink power margin generated using the PSD limit.

2. The method of claim 1 wherein the uplink power margin is generated by the antenna.

3. The method of claim 1 wherein the motion profile is based on motion of the antenna over a period of time.

4. The method of claim 1 further comprising sending, by the terminal, the first power limit to a hub in the satellite communication system.

5. The method of claim 1 further comprising adapting the uplink power margin over time.

6. The method of claim 1 further comprising changing the uplink power margin based on predicted motion of the antenna motion.

7. The method of claim 1 wherein generating the first power limit comprises reducing the second power limit based on the uplink power margin.

8. The method of claim 1 further comprising: calculating the pointing angle, including generating a scan angle and a geographic skew angle of the antenna; generating a second power limit based on the scan angle and the geographic skew angle; and updating the second power limit to create the first power limit by reducing the second power limit by the uplink power margin based on motion data.

9. The method of claim 8 wherein the motion data comprises data from one or more motion sensors of the antenna and historical motion data of the antenna.

10. The method of claim 9 wherein generating the power limit based on the scan angle and the geographic skew angle comprises obtaining the second power limit from a lookup table (LUT) using the scan angle and geographic skew angle.

11. A satellite terminal for use in a satellite communication system, the terminal comprising: an aperture having radiating antenna elements operable to radiate radio frequency (RF) signals; a modem coupled to the aperture; one or more processors coupled to the modem and operable to: perform a motion power margin calculation by changing an uplink power margin, based on Power Spectral Density (PSD) and based on a motion profile created using associated with current and historical motion of an antenna of a satellite terminal, to avoid the PSD of the antenna exceeding a PSD limit, wherein the current and historical motion of the antenna is based on motion data representing motion of the terminal collected by the terminal, perform uplink power control by generating a first power limit representing a maximum transmit power for the antenna based, at least in part, on the uplink power margin generated using the PSD limit, and send the first power limit to a satellite hub.

12. The terminal of claim 11 wherein the one or more processors are part of an antenna subsystem module (ASM) that includes the aperture.

13. The terminal of claim 11 wherein the one or more processors generate the first power limit by reducing a second power limit based on the uplink power margin.

14. The terminal of claim 11 wherein the one or more processors are further operable to: calculate the pointing angle, including outputting a scan angle and a geographic skew angle of the antenna; generate a second power limit based on the scan angle and the geographic skew angle; and update the second power limit to create the first power limit by reducing the second power limit by the uplink power margin based on motion data.

15. An article of manufacture having one or more non-transitory computer readable media storing instruction thereon which, when executed by a terminal having an antenna, a modem and a controller, cause the terminal to perform a method comprising: changing an uplink power margin, based on Power Spectral Density (PSD) and based on a motion profile created using associated with current and historical motion of an antenna of a satellite terminal, to avoid the PSD of the antenna exceeding a PSD limit, wherein the current and historical motion of the antenna is based on motion data representing motion of the terminal collected by the terminal; and performing uplink power control by generating a first power limit representing a maximum transmit power for the antenna based, at least in part, on the uplink power margin generated using the PSD limit.

16. The article of manufacture of claim 15 wherein generating the first power limit comprises reducing the first power limit based on the uplink power margin.

17. The article of manufacture of claim 15 wherein the method further comprises: calculating the pointing angle, including outputting a scan angle and a geographic skew angle of the antenna; generating a second power limit based on the scan angle and the geographic skew angle, including obtaining the second power limit from a lookup table (LUT) using the scan angle and geographic skew angle; updating the second power limit to create the first power limit by reducing the second power limit by the uplink power margin based on motion data, wherein the motion data comprises data from one or more motion sensors of the antenna and historical motion data of the antenna.

18. A method for use in a satellite communication system, the method comprising: changing an uplink power margin, based on Power Spectral Density (PSD) and based on a motion profile created using associated with current and historical motion of an antenna of a satellite terminal, to avoid the PSD of the antenna exceeding a PSD limit, wherein the current and historical motion of the antenna is based on motion data representing motion of the terminal collected by the terminal; and sending the uplink power margin to the hub for use in generating a power limit for the satellite terminal for uplink power control, the power limit representing a maximum transmit power for the antenna based, at least in part, on the uplink power margin generated using the PSD limit.

\* \* \* \* \*